United States Patent
Tsai

(10) Patent No.: US 8,384,290 B2
(45) Date of Patent: Feb. 26, 2013

(54) ILLUMINATION SYSTEM ADAPTABLE TO A COOLING APPLIANCE

(75) Inventor: Wen-Kuei Tsai, Taipei (TW)

(73) Assignee: Top Energy Saving System Corp., New Taipei (TW)

( * ) Notice: Subject to any disclaimer, the term of this patent is extended or adjusted under 35 U.S.C. 154(b) by 322 days.

(21) Appl. No.: 12/789,343

(22) Filed: May 27, 2010

(65) Prior Publication Data

US 2011/0241548 A1  Oct. 6, 2011

(30) Foreign Application Priority Data

Apr. 2, 2010  (TW) ................................ 99110264 A

(51) Int. Cl.
*H05B 37/02* (2006.01)
*F21V 29/00* (2006.01)

(52) U.S. Cl. .......... 315/117; 315/32; 315/112; 315/118; 315/291; 315/309; 362/92; 362/93; 362/94

(58) Field of Classification Search .......... 315/112–118, 315/291; 362/92–94
See application file for complete search history.

(56) References Cited

U.S. PATENT DOCUMENTS

| 6,960,745 | B2 * | 11/2005 | Levy et al. | 219/507 |
| 2008/0304255 | A1 * | 12/2008 | Cauchois | 362/183 |
| 2009/0306607 | A1 * | 12/2009 | Yasuhiro | 604/291 |

* cited by examiner

*Primary Examiner* — Douglas W Owens
*Assistant Examiner* — Thai Pham
(74) *Attorney, Agent, or Firm* — Stout, Uxa, Buyan & Mullins, LLP

(57) ABSTRACT

The present invention is directed to an illumination system adaptable to a cooling appliance. The illumination system includes a lighting module, a mode switch and a controller. Specifically, the lighting module includes at least one lighting device; the mode switch is used to determine a power mode for the lighting module; and the controller provides corresponding power to the lighting device according to the power mode. In one embodiment, the illumination system further includes a heating module having a heater for providing heat to the controller. In another embodiment, the lighting device is disposed near the controller.

16 Claims, 3 Drawing Sheets

ILLUMINATION SYSTEM ADAPTABLE TO A COOLING APPLIANCE

CROSS-REFERENCE TO RELATED APPLICATIONS

The entire contents of Taiwan Patent Application No. 099110264, filed on Apr. 2, 2010, from which this application claims priority, are incorporated herein by reference.

BACKGROUND OF THE INVENTION

1. Field of the Invention

The present invention generally relates to an illumination system, and more particularly to an illumination system adaptable to a cooling appliance.

2. Description of Related Art

Due to various advantages of a light-emitting diode (LED) such as small volume, short response time, low power consumption, high reliability and high feasibility of mass production, the LED is replacing conventional lighting device such as light bulb or fluorescent lamp. The LED may be widely applied in various lighting applications such as indoor lighting, outdoor lighting or light indication. Moreover, the LED may be used as a lighting device in an extreme condition such as a cooling appliance of commercial or industrial use.

However, in such extreme condition, the LED may be over-heated or even damaged owing to improper use. Further, an illumination may not recover from an abnormal condition (e.g., power blackout) due to overly low temperature of a control circuit.

Accordingly, a need has arisen to propose a novel illumination system adaptable to a cooling appliance to protect the LED and ensure normal working of the illumination system.

SUMMARY OF THE INVENTION

An object of the embodiment of the present invention is to provide an illumination system adaptable to a cooling appliance that is capable of switching power mode and protecting a lighting device in an abnormal condition to ensure normal working of a controller.

According to one embodiment, an illumination system adaptable to a cooling appliance includes a lighting module, a mode switch and a controller. Specifically, the lighting module includes at least one lighting device. The mode switch determines a power mode for the lighting module. The controller provides corresponding power to the lighting device according to the power mode. In one embodiment, the illumination system further includes a heating module having a heater for providing heat to the controller. In another embodiment, the lighting device is disposed near the controller to prevent the temperature of the controller from being too low.

DETAILED DESCRIPTION OF THE INVENTION

Figure 1:
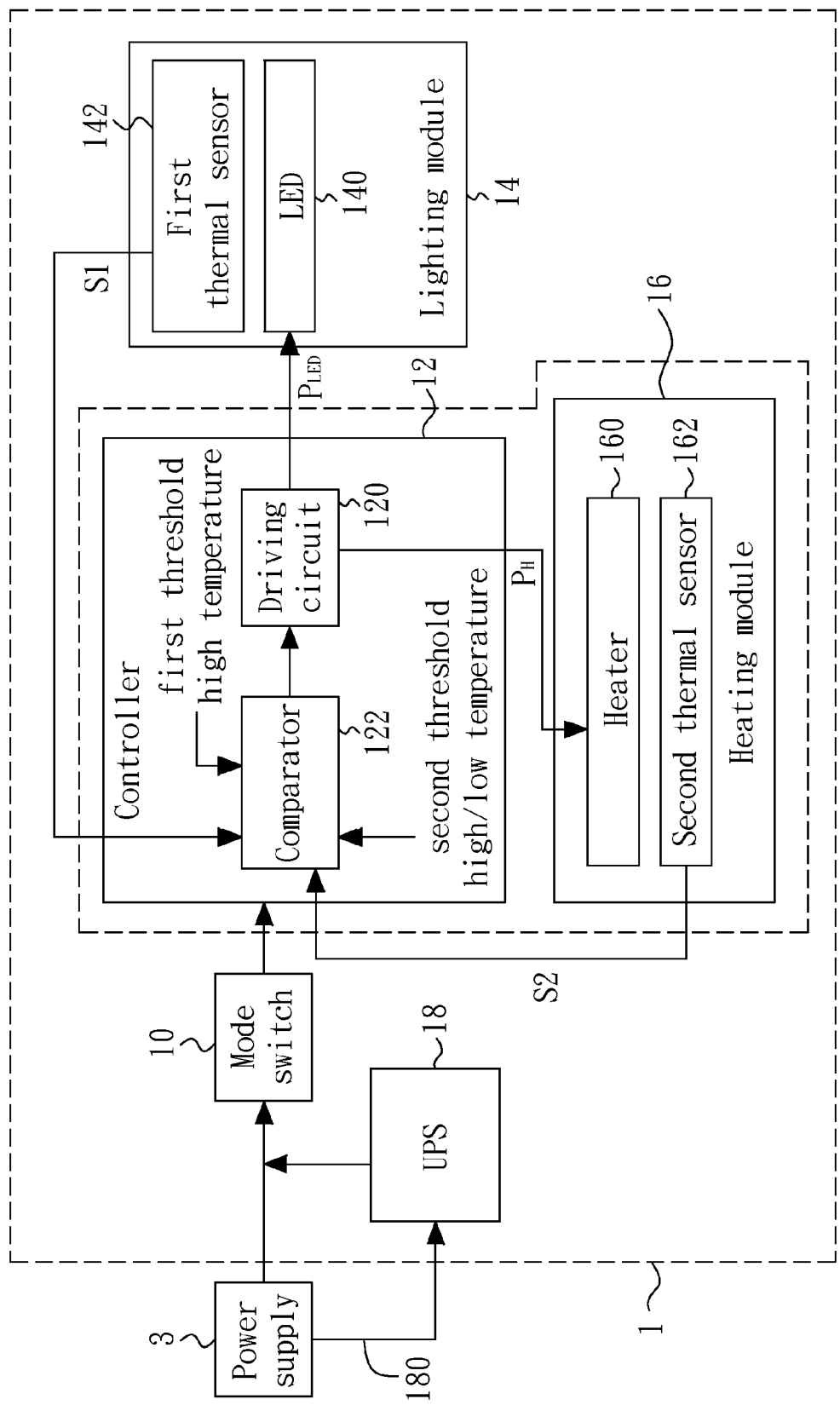
FIG. 1 shows a block diagram of an illumination system adaptable to a cooling appliance according to one embodiment of the present invention.

FIG. 1 shows a block diagram of an illumination system 1 adaptable to a cooling appliance according to one embodiment of the present invention. The illumination system of the present invention may be adapted to any cooling appliance of industrial, commercial or household use.

The illumination system 1 primarily includes a mode switch 10, a controller 12, a lighting module 14 and a heating module 16. In the embodiment, the mode switch 10 is a normally-closed (NC) switch, which forms a closed circuit in a normal condition. The circuit becomes open when the mode switch 10 is pressed, and the circuit becomes closed again when the mode switch 10 is released. As shown in FIG. 1, one terminal of the mode switch 10 receives power from a power supply 3, and another terminal of the mode switch 10 is coupled to transfer the power to the controller 12.

In the embodiment, the controller 12 receives the power transferred from the mode switch 10, and a driving circuit 120 is utilized to generate corresponding power $P_{LED}$ to drive a lighting device such as a light-emitting device (LED) 140 of the lighting module 14. The preferred embodiment uses at least one LED 140 as the lighting device to achieve the purpose of energy saving. It is appreciated that other types of lighting device such an organic light-emitting device (OLED) may be used in other embodiments. The LED 140 may be driven by current, voltage or by other ways, and the provided power $P_{LED}$ may be current/voltage of direct-current (DC), alternating-current (AC), pulse-width modulation (PWM) or other formats. Further, the controller 12 determines a power mode according to the pressing of the mode switch 10 in order to correspondingly provide proper power to the LED 140. The controller 12 of the present embodiment may be implemented by analog and/or digital circuit or firmware technique.

Figure 2:
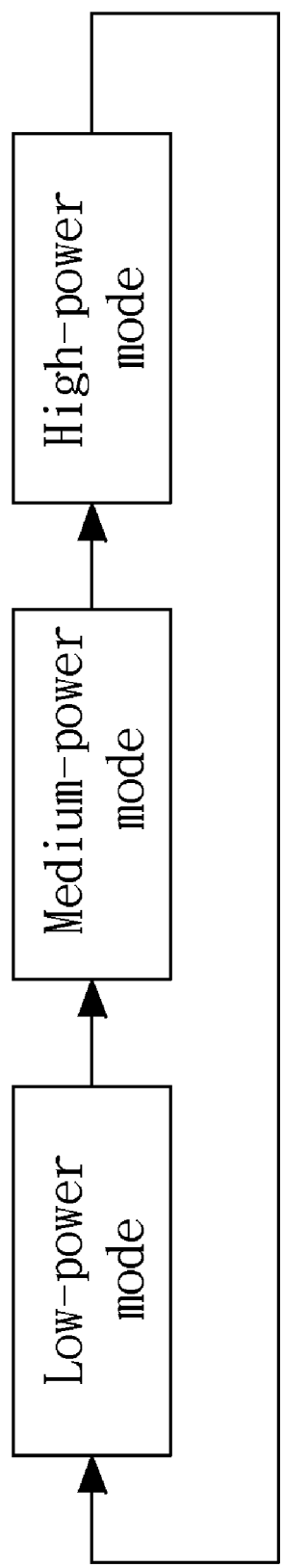
FIG. 2 shows exemplary power mode switching for the LED.

FIG. 2 shows exemplary power mode switching for the LED 140. As the controller 12 detects the pressing and releasing of the mode switch 10, a low-power mode (e.g., 0 or 1 watt) is switched to a medium-power mode (e.g., 10 watts). As the controller 12 detects once again the pressing and releasing of the mode switch 10, the medium-power mode is switched to a high-power mode (e.g., 20 watts). As the controller 12 detects once more the pressing and releasing of the mode switch 10, the high-power mode is switched back to the low-power mode. The power modes may therefore be recursively switched in order. It is appreciated that the power mode switching shown in FIG. 2 is merely instantiated. The number of the power modes and their sequence may be arranged according to a specific application, and are not limited by that depicted in FIG. 2.

In the embodiment, the lighting module 14 further comprises a first thermal sensor (or temperature sensor) 142, which is disposed near the LED 140 to detect the temperature of the LED 140. The term "near" in this specification may refer to two objects that contact one another, or may refer to two objects that are at a predetermined distance from one another. A first sense signal S1 generated by the first thermal sensor 142 is fed to the controller 12. Accordingly, when the temperature of the LED 140 is too high (e.g., higher than a predetermined first threshold high temperature) in an abnormal condition caused, for example, by power blackout or improper use by a user, a comparator 122 of the controller 12 may detect the abnormality by comparing the first sense signal S1 with the first threshold high temperature. Based on the detection, abnormality handling may be performed, for example, by decreasing the power $P_{LED}$ provided to the LED 140, in order to prevent damage or shortened lifetime in the LED 140. Although single first threshold high temperature is used in the embodiment, more than one threshold high temperature may be used in other embodiments to adjust different power $P_{LED}$ respectively. The term "first" threshold high temperature in this specification refers a threshold high temperature associated with the first sense signal 51.

In the embodiment, the heating module 16 is disposed near the controller 12. The heating module 16 includes a heater 160 and a second thermal sensor 162, and a second sense signal S2 generated by the second thermal sensor 162 is fed to the controller 12. Accordingly, when the temperature of the controller 12 is too low (e.g., lower than a predetermined second threshold low temperature such as −20 degree Celsius) in an abnormal condition, the comparator 122 of the controller 12 may detect the abnormality by comparing the second sense signal S2 with the second threshold low temperature. At that time, the controller 12 may utilize the driving circuit 120 to provide a proper power $P_H$ to the heater 160 such that the generated heat may maintain the controller 12 at a proper temperature to ensure normal working of the controller 12.

In another embodiment, the comparator 122 of the controller further compares the second sense signal S2 with a predetermined second threshold high temperature (which may be not the same as the first threshold high temperature associated with the first sense signal S1). When the second sense signal S2 is greater than the second threshold high temperature, the power $P_H$ provided to the heater 160 is decreased in order to prevent the temperature of the heater 160 from being too high. Although single second threshold high temperature and single second threshold low temperature are used in the embodiment, multiple threshold temperatures between the second threshold high temperature and the second threshold low temperature may be used in other embodiments to adjust different power $P_H$ respectively. The heater 160 may be driven by current, voltage or by other ways, and the provided power $P_H$ may be current/voltage of DC, AC, PWM or other formats. The term "second" threshold high/low temperature in this specification refers a threshold high/low temperature associated with the second sense signal S2.

The embodiment may further include an uninterruptible power supply (UPS) 18. When power interruption (e.g., power blackout) of the power supply 3 is detected via a conducting wire 180, the UPS 18 may provide power, via the mode switch 10, to the controller 12, the lighting module 14 and/or the heating module 16.

Figure 3:
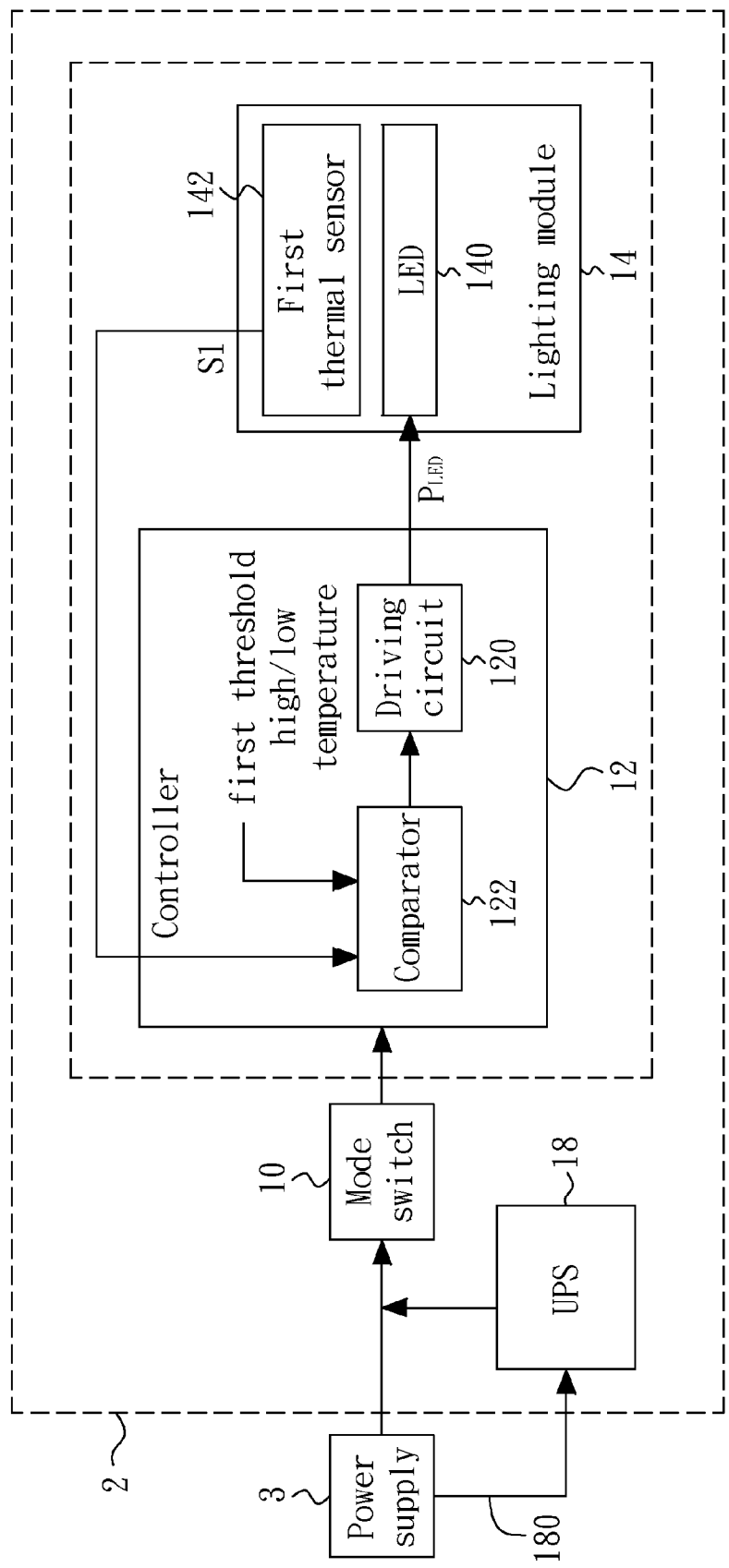
FIG. 3 shows a block diagram of an illumination system adaptable to a cooling appliance according to another embodiment of the present invention.

FIG. 3 shows a block diagram of an illumination system 2 adaptable to a cooling appliance according to another embodiment of the present invention. The blocks being the same as those in FIG. 1 use same reference numerals, and their associated functions or compositions are omitted for brevity. The present embodiment (FIG. 3) is similar to the previous embodiment (FIG. 1), with the main exception that the lighting module 14 of the present embodiment is disposed near the controller 12 to provide the LED generated heat to the controller 12 in order to prevent the temperature of the controller 12 from being too low. Accordingly, the present embodiment may omit the heating module 16, and therefore may substantially save cost and energy. The present embodiment uses at least one LED 140 as the lighting device to achieve the purpose of energy saving. It is appreciated that other types of lighting device such an organic light-emitting device (OLED) may be used in other embodiments.

The present embodiment may adopt the power mode switching depicted in FIG. 2, but the low-power mode need provide power greater than 0 watt to the LED 140 to ensure that the temperature of the controller 12 is not too low. In the embodiment, the first thermal sensor 142 is capable of detecting not only the first threshold high temperature to prevent the temperature of the LED 140 from being too high, but also the first threshold low temperature to prevent the temperature of the controller 12 from being too low. When the comparator 122 detects that the first sense signal S1 is greater than the first threshold high temperature, the power $P_{LED}$ provided to the LED 140 is decreased to prevent the temperature of the LED 140 from being too high. When the comparator 122 detects that the first sense signal S1 is lesser than the first threshold low temperature, the power $P_{LED}$ provided to the LED 140 is increased to prevent the temperature of the controller from being too low. The term "first" threshold high/low temperature in this specification refers a threshold high/low temperature associated with the first sense signal S1.

Although specific embodiments have been illustrated and described, it will be appreciated by those skilled in the art that various modifications may be made without departing from the scope of the present invention, which is intended to be limited solely by the appended claims.

What is claimed is:

1. An illumination system adaptable to a cooling appliance, comprising:
   a lighting module including at least one lighting device;
   a mode switch configured to determine a power mode for the lighting module;
   a controller configured to provide corresponding power to the lighting device according to the power mode;
   a heating module having a heater for providing heat to the controller; and
   a first thermal sensor disposed near the lighting device and configured to generate a first sense signal for use by the controller, wherein the controller comprises a comparator configured to compare the first sense signal with at least one predetermined first threshold high temperature in order to prevent a temperature of the lighting device from being exceeding the predetermined threshold.

2. The system of claim 1, wherein the lighting device is one of following: a light-emitting diode (LED) and an organic light-emitting diode (OLED).

3. The system of claim 1, wherein the mode switch is a normally-closed switch.

4. The system of claim 1, wherein one terminal of the mode switch receives the power, and another terminal of the mode switch transfers the power to the controller.

5. The system of claim 1, wherein the controller comprises a driving circuit configured to generate the corresponding power to the lighting device.

6. The system of claim 1, wherein the heating module further comprises a second thermal sensor disposed near the controller and configured to generate a second sense signal.

7. The system of claim 6, wherein the controller comprises a comparator configured to compare the second sense signal with at least one predetermined second threshold low temperature in order to prevent a temperature of the controller from being too low.

8. The system of claim 6, wherein the controller comprises a comparator configured to compare the second sense signal with at least one predetermined second threshold high temperature in order to prevent a temperature of the heater from being too high.

9. The system of claim 1, further comprising an uninterruptible power supply configured to provide the power, via the mode switch, to the controller, the lighting module and/or the heating module, when a supply interruption of the power is detected.

10. An illumination system adaptable to a cooling appliance, comprising:
    a lighting module including at least one lighting device;
    a mode switch configured to determine a power mode for the lighting module;

a controller configured to provide corresponding power to the lighting device according to the power mode, wherein the lighting device is disposed near the controller; and a first thermal sensor disposed near the lighting device and configured to generate a first sense signal for use by the controller, wherein the controller comprises a comparator configured to compare the first sense signal with at least one predetermined first threshold high temperature in order to prevent a temperature of the lighting device from being exceeding the predetermined threshold.

11. The system of claim 10, wherein the lighting device is one of following: a light-emitting diode (LED) and an organic light-emitting diode (OLED).

12. The system of claim 10, wherein the mode switch is a normally-closed switch.

13. The system of claim 10, wherein one terminal of the mode switch receives the power, and another terminal of the mode switch transfers the power to the controller.

14. The system of claim 10, wherein the controller comprises a driving circuit configured to generate the corresponding power to the lighting device.

15. The system of claim 10, wherein the controller comprises a comparator configured to compare the first sense signal with at least one predetermined first threshold low temperature in order to prevent a temperature of the controller from being too low.

16. The system of claim 10, further comprising an uninterruptible power supply configured to provide the power, via the mode switch, to the controller and/or the lighting module, when a supply interruption of the power is detected.

* * * * *